(12) United States Patent
Oh

(10) Patent No.: US 7,707,610 B2
(45) Date of Patent: Apr. 27, 2010

(54) TELECOMMUNICATION DEVICE AND METHOD OF MULTIMEDIA DATA PROCESSING VIA THE TELECOMMUNICATION DEVICE HAVING AT LEAST TWO PROCESSORS

(75) Inventor: Hyo Sub Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 1086 days.

(21) Appl. No.: 10/897,606

(22) Filed: Jul. 22, 2004

(65) Prior Publication Data

US 2005/0022255 A1    Jan. 27, 2005

(30) Foreign Application Priority Data

Jul. 24, 2003    (KR)    ............... 10-2003-0051053

(51) Int. Cl.
| | |
|---|---|
| H04N 7/16 | (2006.01) |
| H04N 7/12 | (2006.01) |
| G06F 15/76 | (2006.01) |
| G06F 7/38 | (2006.01) |
| G06F 15/16 | (2006.01) |

(52) U.S. Cl. ................... 725/62; 712/34; 712/35; 712/234; 375/240.26; 709/231; 709/236

(58) Field of Classification Search ............ 725/62; 712/34, 35, 234; 375/240.26; 709/231, 236
See application file for complete search history.

(56) References Cited

U.S. PATENT DOCUMENTS

| | | | | |
|---|---|---|---|---|
| 6,226,031 | B1 * | 5/2001 | Barraclough et al. ...... | 348/14.13 |
| 6,337,856 | B1 * | 1/2002 | Schanhals et al. ......... | 370/352 |
| 6,985,189 | B1 * | 1/2006 | Takada et al. .............. | 348/558 |

OTHER PUBLICATIONS

Ramamurthi, Shiv, et al. "Multimedia Technologies on Terminals Based on the OMAP Platform." Texas Instruments, Jun. 2002.

\* cited by examiner

*Primary Examiner*—Hoang-Vu A Nguyen-Ba
(74) *Attorney, Agent, or Firm*—Lee, Hong, Degerman, Kang & Waimey

(57) ABSTRACT

Disclosed is a method for processing multimedia data at a mobile communication terminal having at least one sub processor besides a main processor, including the steps of analyzing information of multimedia data to be processed at the main processor, selecting a processor at the main processor for processing the multimedia data according to analyzed result of the information, calling codec needed for the data processing at the selected processor, and processing the multimedia data at the selected processor by using the called codec.

6 Claims, 2 Drawing Sheets

TELECOMMUNICATION DEVICE AND METHOD OF MULTIMEDIA DATA PROCESSING VIA THE TELECOMMUNICATION DEVICE HAVING AT LEAST TWO PROCESSORS

CROSS-REFERENCE TO RELATED APPLICATIONS

This application claims the benefit of Korean Application No. P2003-51053, filed on Jul. 24, 2003, which is hereby incorporated by reference as if fully set forth herein.

BACKGROUND OF THE INVENTION

1. Field of the Invention

The present invention relates to a telecommunication device and a method for processing multimedia data by using the same, and more particularly, to a telecommunication device using a sub processor (DSP) besides a main processor (CPU) and a method for processing multimedia data at the telecommunication device so as to provide a codec at each processor and selectively use an effective codec at need.

2. Discussion of the Related Art

Multimedia data in a communication field usually means enabling to multiplex not only voice data but also TV picture or computer data and transmit through one line. Recently, with an improvement of data management in a mobile communication terminal, a sub processor for processing multimedia data is additionally provided besides a main processor. In this case, a digital signal processor (DSP) is normally used as the sub processor for multimedia data processing. As a microprocessor including one IC chip for signal processing by a digital calculation, the DSP (Digital Signal Processor) is an exclusive microprocessor having realized a high-speed calculation and a compact size by largely improving the architecture of a conventional microprocessor. By using the DSP and CODEC, an attempt to utilize the multimedia service in the mobile communication terminal is actively in progress. The codec (compression/decompression: codec) is an algorithm or a specialized program for reducing a storage space taken up by large files or programs. Such compressing method is used for minimizing the storage space largely required by complex files such as video. The file is compressed by removing repeated parts in the data.

As an example, there is a radio data service using the mobile communication terminal, and the radio data service is a service enabling not only a general file transmission but also all services offered from the PSTN and PDSN, such as information retrieval, internet connection and fax transmission/reception through a PC communication connection, in a radio section using the mobile communication terminal.

Owing to the radio communication service, users are able to have a mobile office and to be free from time and place, and to manage business rapidly.

It is general to use DSP for realizing multimedia at the mobile communication terminal having a weak processing environment. However, it generates a problem of wasting resources to use DSP for contents not necessarily processed by the DSP.

SUMMARY OF THE INVENTION

Accordingly, the present invention is directed to a telecommunication device and a method for processing multimedia data that substantially obviates one or more problems due to limitations and disadvantages of the related art.

An object of the present invention is to provide a telecommunication device using a sub processor (DSP) besides a main processor (CPU) and a method for processing multimedia data at the telecommunication device so as to provide a codec at each processor and selectively use an effective codec at need.

The most distinguishable characteristic of the method for processing multimedia data in the mobile communication terminal in accordance with the present invention is selecting a processor for processing multimedia data according to the characteristics of the multimedia data at the mobile communication terminal having a sub processor for processing multimedia data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing multimedia data in the mobile communication terminal in accordance with the present invention includes the steps of analyzing information of multimedia data to be processed at the main processor, selecting a processor at the main processor for processing the multimedia data according to analyzed result of the information, calling codec needed for the data processing at the selected processor, and processing the multimedia data at the selected processor by using the called codec.

A mobile communication terminal in accordance with the present invention includes a main processor performing general control of the mobile communication terminal, and selectively processing according to the characteristic of the multimedia data to be processed, at least one sub processor for multimedia data processing, and a memory storing different codecs at locations accessible from the main processor and the sub processor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
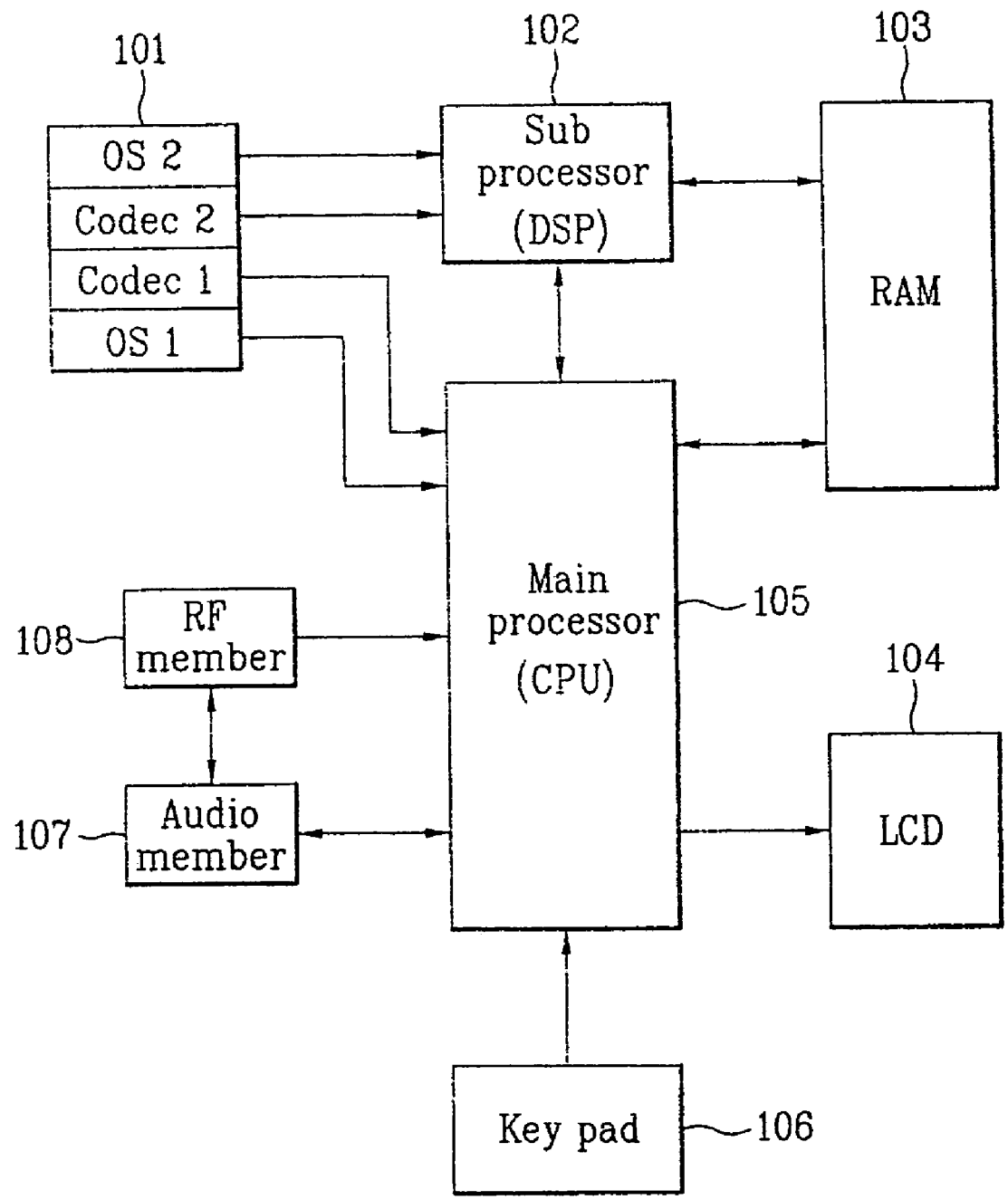
FIG. 1 illustrates a block diagram showing an inside structure of a mobile communication terminal in accordance with the present invention.

FIG. 1 illustrates a block diagram showing an inside structure of a mobile communication terminal in accordance with the present invention. The mobile communication terminal includes a main processor 105 for controlling general functions of the mobile communication terminal, a sub processor (DSP) 102 for multimedia data processing, a memory 101 for storing an operating system OS1™, OS2™ used in the main processor 105 and the sub processor 102, and codec 1, codec 2 used in each processors, a radio frequency member 108 for transmitting and receiving various information in a radio form, a random access memory (RAM) 103 for storing called/transmitted data when general functions of the terminal is performed by the main processor 105, an audio member 107 modulating a voice signal inputted through a microphone into a radio signal according to a control signal of the main processor 105, and demodulating the radio signal received through the radio frequency member 108 and transmitting to a speaker as the voice signal, a key pad 106 having a plurality of number keys and function keys for delivering information inputted by a user to the main processor 105, and a liquid crystal display (LCD) 104 for displaying various information according to the control signal of the main processor 105.

The sub processor (DSP) 102 is a supplementary sub processor used only for multimedia data processing. Almost every application program is controlled by the operation system (OS1™)222 in the main processor CPU 105. As a processor for digital signal processing, the sub processor (DSP) 102, in this instance, using a codec 2 stored in a predetermined area of the memory 101, is controlled by the OS2™.

Figure 2:
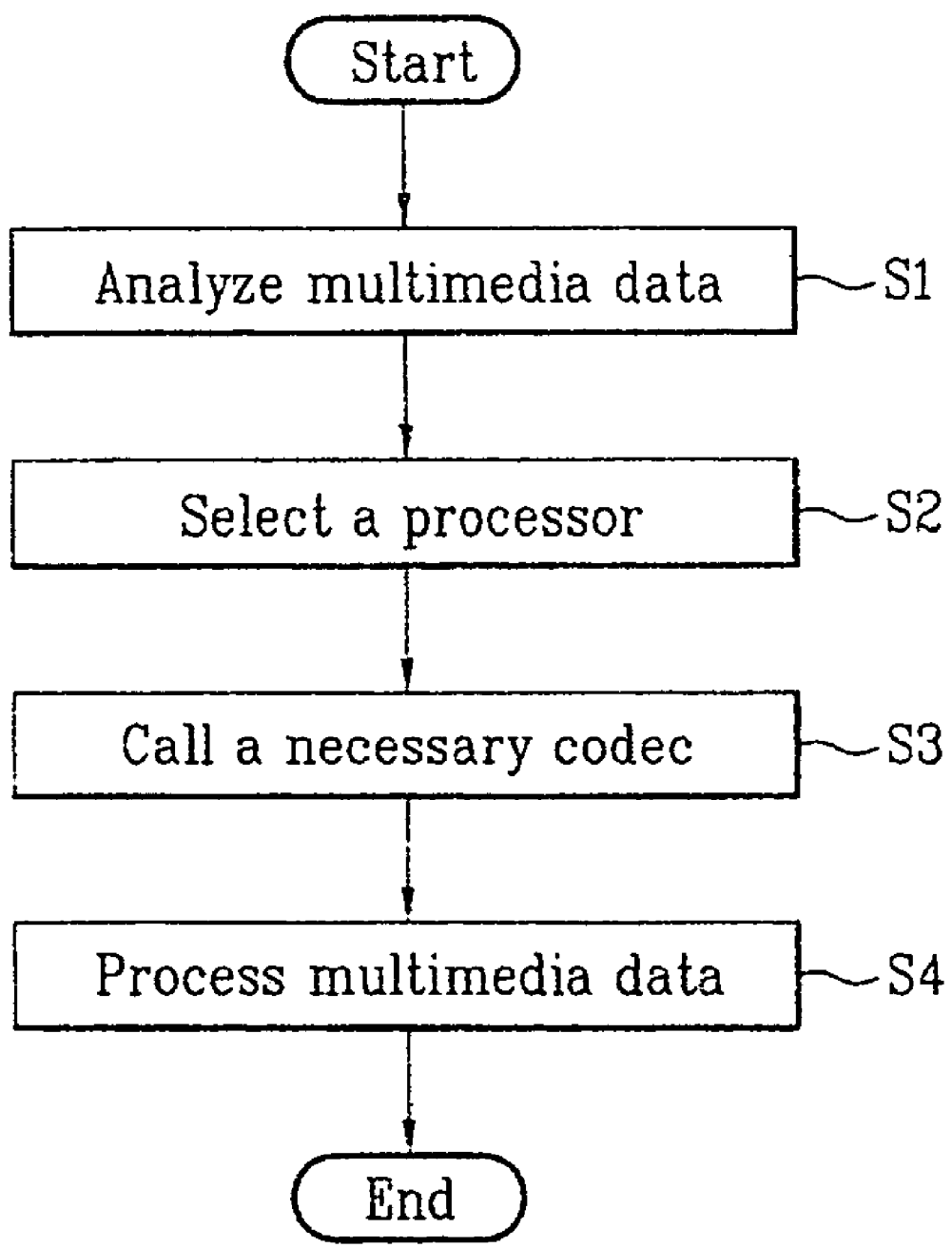
FIG. 2 illustrates a flow chart showing a process of multimedia data processing in accordance with the present invention.

FIG. 2 illustrates a flow chart showing a process of multimedia data processing in accordance with the present invention. A process for processing multimedia data is described in accordance with the present invention with reference to FIG. 2. First, in the main processor 105, multimedia data to be processed is analyzed, i.e., the type of data is called and determined whether the type information of data is audio data, or video data, or image data. And then, a processor is selected for processing corresponding multimedia data according to the analyzed result. In other words, according to characteristics of the corresponding multimedia data, it is determined whether to process the multimedia data in the main processor 105 or in the sub processor 102. In general, it is effective to process video data or audio data in the multimedia data processor 102. Accordingly, description will be made of a case of an example in which the multimedia data is image data hereinafter. However, it is apparent that a standard described hereinafter is applied to video data and audio data besides the image data. As described in FIG. 1, in the memory 101, codec 1 and codec 2 with different characteristics are stored at different addresses respectively.

Since, it takes a long time for calculating video data and audio data, it is effective to operate the sub processor 102, the multimedia data processor.

However, when the data to be processed is image data, and when the main processor 105 is enough to process the data, it is effective to process the data at the main processor 105 by using codec 2. The main processor 105 reads information value of the multimedia data to be processed. For example, in an OMAP™ (operation and maintenance application part), a small image in less than 60*60 of file size is not processed in the sub processor 102, which is for multimedia data processing, but is processed in the main processor. However, in the OMAP™ structure, a large image larger than 100*100 is processed in the sub processor.

In this instance, the factors for determination are various. In other words, a processor is determined according to the file size of the multimedia data to be processed, or according to the resolution of the file when the data type is image data or video data, or according to sampling frequency and a frame rate when the data type is video data, or according to sampling frequency when the data type is audio data. When the file is an audio file, it is effective that a CD/DVD sound quality with high sampling frequency is processed at the sub processor and a radio sound quality with low sampling frequency is processed at the main processor (S2).

After the processor is determined for processing multimedia data according to the characteristic of the multimedia data, the codec to be used at the corresponding processor is read from the memory. In this case, the codec to be used may be stored at different addresses in one memory, or may be stored in a separate memory (S3) in a form accessible from each processor.

When the data is processed at the main processor, the main processor (CPU) 105 performs a series of decoding operations by calling codec 1, and ends an action.

If the data needs to be processed at the sub processor, the sub processor performs a series of decoding operations by calling the codec 2, and ends an action (S4).

When the main processor performs the codec operation, electricity is not additionally consumed because the main processor is already in use. Accordingly, other data except the data related to video data and audio data do not use the sub processor, thereby preventing unnecessary waste of resources.

As described above, the present invention provides codec to both processors in the mobile communication terminal using the main processor (CPU) and the sub processor (DSP), and selectively uses more effective codec at need. Therefore, the user obtains convenience of use and an effect of resource reduction when selectively using a proper codec according to the size and characteristic of the multimedia content.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing multimedia data in a mobile communication terminal having at least one sub processor and a main processor, the method comprising:
reading an information value of the multimedia data at the main processor, wherein the information value of the multimedia data is associated with at least one of a file type and a file size;
selecting either the main processor or the at least one sub processor at the main processor to process the multimedia data according to the information value of the multimedia data;
calling a codec configured for the multimedia data processing at the selected main processor or at least one sub processor; and
processing the multimedia data at the selected main processor or at least one sub processor by using the called codec,
wherein the information value of the multimedia data is further associated with the resolution of the file when the multimedia data is image data or video data, wherein the information value of the multimedia data is further associated with a sampling frequency and a frame rate when the multimedia data is video data, wherein the information value of the multimedia data is further associated with the sampling frequency when the multimedia data is audio data.

2. The method of claim 1, wherein the at least one sub processor is a digital signal processor.

3. The method of claim 1, further comprising the step of storing the codec to be called at different addresses in one memory.

4. A mobile communication terminal for processing multimedia data, the mobile communication terminal comprising:
   a main processor for performing general control of the mobile communication terminal, for reading an information value of the multimedia data which is associated with at least one of a file type and a file size, and for processing the multimedia data;
   at least one sub processor for processing the multimedia data; and
   a memory for storing different codecs at different locations accessible from the main processor and the at least one sub processor,
   wherein the main processor selects either the main processor or the at least one sub processor to process the multimedia data according to the information value of the multimedia data,
   wherein the information value of the multimedia data is further associated with the resolution of the file when the multimedia data is image data or video data,
   wherein the information value of the multimedia data is further associated with a sampling frequency and a frame rate when the multimedia data is video data,
   wherein the information value of the multimedia data is further associated with the sampling frequency when the multimedia data is audio data.

5. The mobile communication terminal of claim 4, wherein the at least one sub processor is a digital signal processor.

6. The mobile communication terminal of claim 4, wherein the different codecs are stored at different addresses in the memory.

* * * * *